United States Patent Office 3,510,513
Patented May 5, 1970

3,510,513
PREPARATION OF A PURIFIED BENZO-
PHENONE CARBOXYLIC ACID
John H. McCracken, Pitcairn, Johann G. D. Schulz, Pittsburgh, and John V. Ward, Oakmont, Pa., assignors to Gulf Research & Development Company, Pittsburgh, Pa., a corporation of Delaware
No Drawing. Substituted for abandoned application Ser. No. 72,566, Nov. 30, 1960. This application Mar. 23, 1966, Ser. No. 536,609
Int. Cl. C07c 65/20, 63/02
U.S. Cl. 260—517     3 Claims

ABSTRACT OF THE DISCLOSURE

A process for purifying an impure benzophenone carboxylic acid which comprises subjecting an aqueous slurry of the acid to an elevated temperature and an elevated pressure in the presence of hydrogen and a hydrogenation catalyst.

---

This application relates to a process for purifying diarylketones and more particularly to a process for purifying diarylketone carboxylic acids.

Diarylketones which can be purified in accordance with the procedure of this invention can be represented in general by the following structural formula:

wherein $R_1$ and $R_2$, the same or different, are aryl radicals containing one or more rings, at least one of which is an aromatic ring, such as phenyl, biphenyl, naphthyl, phenanthryl, anthryl, indyl, dihydronaphthyl, cyclohexylphenyl, said aryl radicals carrying as nuclear substituents one to five radicals selected from the group consisting of primary, secondary and tertiary alkyls having from one to 16 carbon atoms, preferably from one to eight carbon atoms, such as methyl, ethyl, n-propyl, isopropyl, isobutyl, amyl, isoamyl, hexyl, isooctyl, decyl, tetradecyl, hexadecyl, etc., F, Cl, Br, I, COOH, COOR (where R is an alkyl group) OH, etc., at least one of said radicals being COOH. Specific examples of diarylketone carboxylic acids which can be purified in accordance with the process of this invention are benzophenone 4-methyl 4'-carboxylic acid, benzophenone 4,4'-dicarboxylic acid, benzophenone 2,4,2',4' - tetracarboxylic acid, benzophenone 3,4,3',4'-tetracarboxylic acid, 2 - alpha-naphtholylbenzoic acid, 3-decyl, 4-cyclohexyl, 4' - hexadecylbenzophenone, 1-anthroyl, 2-bromo, 4-hydroxy, 5-carboxy phenanthrene, etc.

The process of this invention is particularly applicable in the purification of diarylketone carboxylic acids, such as benzophenone 4,4'-dicarboxylic acid, prepared in accordance with the procedure set forth in U.S. Pat. No. 3,075,007, dated Jan. 22, 1963. Briefly, in the process of the patent, a 1,1-diarylalkane, such as 1,1-di(para)tolylethane, is oxidized with nitric acid having a concentration of about five to about 70 percent at a temperature of about 110° to about 350° C. and a pressure of about atmospheric to about 500 pounds per square inch gauge for about one minute to about 48 hours. At the end of this time a solid amorphous benzophenone dicarboxylic acid, such as benzophenone 4,4'-dicarboxylic acid, precipitates out of the reaction mixture and can be recovered therefrom by simple filtration. Unfortunately, the benzophenone carboxylic acid so produced, instead of being desirably white, is admixed with contaminants which render the same yellow or tan.

We have found that diarylketones so produced can be purified of undesirable contaminants and rendered substantially colorless by a process which consists in admixing the same with an aqueous medium such as water and a hydrogenation catalyst, heating the resulting mixture with hydrogen at an elevated temperature for a selected amount of time and thereafter mechanically separating the components of the treated slurry to recover purified diarylketone carboxylic acid therefrom. As a result of the treatment the contaminants are decomposed or destroyed or otherwise rendered soluble in the aqueous medium. The desired diarylketone carboxylic acid is not water soluble and is therefore easily separated therefrom.

In carrying out the process of this invention the temperature must be at least about 175°, preferably about 250° to about 300° C., and the pressure at least about 150, preferably about 500 to about 1000 pounds per square inch gauge. The time at which the mixture is held at these conditions must be at least about one minute, preferably about 0.5 to about two hours.

The amount of water or other aqueous media such as aqueous solutions of methanol, ethanol, propanol, acetic acid, dioxane, tetrahydrofuran, etc. which is combined with the diarylketone is not critical and must be at least sufficient to form a slurry therewith. Thus the amount of water relative to the diarylketone can be from about 100 to 500 percent by weight. Hydrogenation catalysts which can be employed include nickel, cobalt and copper chromite, provided the amount thereof, relative to the diarylketone, is about one to about 20 percent by weight. Nickel is a preferred catalyst. Hydrogen consumption varies from about 0.02 to about 0.2 percent by weight of the diarylketone, depending on the amount of contaminant in the charge.

The process of this invention can be better described by reference to the following.

EXAMPLE I 336 grams of 1,1-di(para)tolylethane were oxidized with 3000 grams of nitric acid having a concentration of 25 percent at a temperature of 204° C. and a pressure of 350 to 400 pounds per square inch gauge for two hours. The benzophenone 4,4'-dicarboxylic acid recovered amounted to 411 grams and was tan in color. Into a one-liter autoclave equipped with a thermometer and a stirrer there was placed 100 grams of crude amorphous benzophenone 4,4'-dicarboxylic acid so produced, 500 milliliters of water and 20 grams of nickel catalyst (Harshaw 0104). The slurry so obtained was heated in the closed autoclave to a temperature of 250° C. and an autogeneous pressure of 600 pounds per square inch gauge. The contents of the autoclave were heated for an additional hour, during which time hydrogen was added intermittently to the autoclave. The pressure during this period was about 1500 pounds per square inch gauge. At the end of this time the autoclave was cooled to room temperature and the contents thereof removed therefrom. The catalyst and the benzophenone 4,4'-dicarboxylic acid were both present in the reaction mixture in solid form. In order to facilitate the separation of solids from each other and the recovery of the desired acid, 30 grams of sodium hydroxide were added to the liquid product. This resulted in the conversion of the benzophenone 4,4'-dicarboxylic acid to the corresponding sodium salt thereof which is soluble in the water. Any other alkaline reagent such as potassium-hydroxide, ammonium hydroxide and sodium carbonate which would also form the corresponding water soluble salt could have been employed. The catalyst retained its insoluble characteristics. The mixture so obtained was filtered and the catalyst thereby removed. The desired benzophenone 4,4'-dicarboxylic acid was recovered by adding to the filtrate 350 grams of 10 percent hydrochloric acid. By filtration 98 grams of white benzophenone 4,4'-dicarboxylic were thereby recovered. Any other mechanical means, such as centrifuging could also have been employed in the separation. Instead of hydrochloric acid any other acidic medium such as sulfuric acid, phosphoric acid or acetic acid could have been used to convert the soluble salt to the insoluble acid.

It is critical in the process of this invention that the diarylketone carboxylic acids being purified be in solid form as a slurry during the purification procedure, for otherwise the diarylketone carboxylic acids can be hydrogenated and converted to another compound under the conditions used. Thus, as U.S. Pat. No. 3,203,982, dated Aug. 31, 1965, shows when the diarylketone carboxylic acids defined above are rendered soluble in an aqueous medium, for example, by converting the same to the corresponding salts and the latter are then subjected to a temperature of about 100° to about 200° C. and a pressure of about 300 to about 1000 pounds per square inch gauge for a period of about 15 minutes to about 10 hours in the presence of hydrogen and a catalyst, such as cobalt, be converted to a diarylcabinol or a diarylmethane.

On the other hand, when the diarylketone carboxylic acids defined above are rendered soluble in an aqueous medium, for example, by converting the same to the corresponding salts by reaction with approximately the stoichiometric amount of one of the following compounds, a hydroxide or carbonate of sodium, potassium, lithium, rubidium, cesium, beryllium, magnesium or ammonium, and the latter salts in the aqueous medium are subjected to a temperature of at least about 210° C., preferably about 225° C. to about 300° C., and a pressure of at least about 1100 pounds per square inch gauge, preferably about 1200 to about 3000 pounds per square inch gauge, for a period of at least about five minutes, preferably about 15 minutes to about three hours, in the presence of hydrogen and a catalyst, such as cobalt, nickel or copper chromite, depending upon the severity of the conditions used, a dicycloalkyl methane or a cycloalkyl, aryl methane will be obtained. This is shown, for example, by Examples II and III below.

EXAMPLE II

One hundred grams of benzophenone 4,4'-dicarboxylic acid were mixed with 29.6 grams of solid sodium hydroxide and sufficient water to bring the total volume of the solution to 500 milliliters. To this was added 20 grams of nickel (Harshaw 0104) catalyst. The entire mixture was placed in a one-liter, stainless steel, stirred autoclave which was heated at 250° C. for two hours with hydrogen at a pressure of 1400 pounds per square inch gauge. The autoclave was thereafter cooled to 25° C. and depressured. The reaction product was filtered to remove catalyst therefrom. The liquid remaining was mixed with one mol of 10 percent hydrochloric acid. This precipitated the acid, which was recovered by filtration. 96 grams of a white product was recovered, of which 77 grams was identified as 4-carboxyphenyl, 4-carboxycyclohexyl methane and 19 grams as dicyclohexyl methane 4,4'-dicarboxylic acid.

EXAMPLE III

The process of Example II was repeated except that 30 grams of the same nickel catalyst was used and the reaction was permitted to go for four hours and forty-five minutes at a pressure of 2000 pounds per square inch gauge. 88 grams of dicyclohexyl methane 4,4'-dicarboxylic acid was recovered. There was no evidence of 4-carboxyphenyl, 4-carboxycyclohexyl methane.

From the above, it is apparent that in order to purify the diarylketone carboxylic acid and to avoid hydrogenation of the ring and/or bridge carbonyl it is imperative that the purification procedure herein consist in the steps of subjecting the impure diarylketone carboxylic acid to the defined temperature and pressure conditions in the presence of the defined catalyst while the diarylketone carboxylic acid is in the form of an aqueous slurry and thereafter mechanically separating the components of the treated slurry to recover purified diarylketone carboxylic acid.

Obviously many modifications and variation of the invention as hereinabove set forth can be made without departing from the spirit and scope thereof and therefore only such limitations should be made as are indicated in the appended claims.

We claim:
1. A process for obtaining a purified benzophenone carboxylic acid which consists in the steps of subjecting a 1,1-diphenylethane carrying from one to two methyl substituents on each of the rings thereof with nitric acid to obtain an impure benzophenone carboxylic acid, subjecting an aqueous slurry of said impure benzophenone carboxylic acid in the presence of hydrogen and a hydrogenation catalyst selected from the group consisting of nickel, cobalt and copper chromate to a temperature of about 175° to about 300° C. and a pressure of about 150 to about 1500 pounds per square inch gauge for about one minute to about two hours and thereafter mechanically separating from the treated slurry benzophenone carboxylic acid free of the impurities originally associated therewith.

2. The process of claim 1 wherein said 1,1-diphenylethane is 1,1-di(para)tolylethane and said benzophenone carboxylic acid is benzophenone 4,4-dicarboxylic acid.

3. The process of claim 1 wherein said hydrogenation catalyst is nickel amounting to about one to about twenty percent by weight relative to said benzophenone carboxylic acid.

References Cited

UNITED STATES PATENTS

| 3,058,997 | 10/1962 | Taylor et al. | 260—525 |
| 3,075,007 | 1/1963 | McCracken et al. | 260—517 |
| 3,203,982 | 8/1965 | McCracken et al. | 260—517 |

JAMES A. PATTEN, Primary Examiner

U.S. Cl. X.R.

260—525

PO-1050
(5/69)

UNITED STATES PATENT OFFICE
CERTIFICATE OF CORRECTION

Patent No. 3,510,513  Dated May 5, 1970

Inventor(s) John H. McCracken, Johann G. D. Schulz and John V. Ward

It is certified that error appears in the above-identified patent and that said Letters Patent are hereby corrected as shown below:

Column 2, line 14, "1000 pounds" should be replaced with "1500 pounds".

Column 3, between lines 19 and 20, please insert "nickel or copper chromite, the diarylketone charge will".

SIGNED AND
SEALED
AUG 18 1970

(SEAL)
Attest:

Edward M. Fletcher, Jr.
Attesting Officer

WILLIAM E. SCHUYLER, JR.
Commissioner of Patents